US006608946B2

(12) United States Patent
Kikuchi et al.

(10) Patent No.: US 6,608,946 B2
(45) Date of Patent: Aug. 19, 2003

(54) OPTICAL MODULE AND METHOD FOR MANUFACTURING THE SAME

(75) Inventors: Hideo Kikuchi, Tokyo (JP); Satoshi Nakamura, Tokyo (JP); Mitsuo Saitou, Tokyo (JP)

(73) Assignee: NEC Toppan Circuit Solutions, Inc., Tokyo (JP)

( * ) Notice: Subject to any disclaimer, the term of this patent is extended or adjusted under 35 U.S.C. 154(b) by 26 days.

(21) Appl. No.: 10/028,920

(22) Filed: Dec. 28, 2001

(65) Prior Publication Data

US 2002/0085786 A1 Jul. 4, 2002

(30) Foreign Application Priority Data

Dec. 28, 2000 (JP) ........................................ 2000-403445

(51) Int. Cl.[7] ................................................. G02B 6/26
(52) U.S. Cl. .............................. 385/14; 385/43; 385/49; 385/39; 385/129; 385/131
(58) Field of Search ............................... 385/14, 49, 88, 385/89, 129, 130, 131, 132, 39, 43

(56) References Cited

U.S. PATENT DOCUMENTS 6,370,306 B1 * 4/2002 Sato et al. .................. 385/129
2002/0118907 A1 * 8/2002 Sugama et al. ............... 385/14
2003/0026515 A1 * 2/2003 Barenburg et al. ............ 385/14

* cited by examiner

Primary Examiner—Hemang Sanghavi
(74) Attorney, Agent, or Firm—McGinn & Gibb, PLLC

(57) ABSTRACT

An optical module and its manufacturing method are provided which are capable of forming an optical waveguide by making the most of characteristics of a material having small optical transmission loss and excellent machinability or processibility. The optical module includes an optical waveguide sheet having a first optical waveguide and an optical component having a second optical waveguide, wherein the optical component is disposed in an aperture portion in the optical waveguide sheet and an end face of a large diameter portion of a core layer in the second optical waveguide is formed so as to be disposed opposite to an end face of a core layer of the first optical waveguide so that the first optical waveguide and the second optical waveguide are optically coupled.

20 Claims, 8 Drawing Sheets

OPTICAL MODULE AND METHOD FOR MANUFACTURING THE SAME

BACKGROUND OF THE INVENTION

1. Field of the Invention

The present invention relates to an optical module and a method for manufacturing the same and more particularly to the optical module capable of optically coupling optical waveguides, each other, to be connected to optical components and to the method for manufacturing the optical module.

The present application claims priority of Japanese Patent Application No.2000-403445 filed on Dec. 28, 2000, which is hereby incorporated by reference.

2. Description of the Related Art

Optical communication technology using light as a transmission medium of information is becoming widespread. To implement such the optical communication technology, an optical module is used in which optical components including a light emitting element, light receiving element, or a like are mounted on an optical electronic substrate; and in which the optical components are optically coupled through an optical waveguide. To carry out such optical transmission, it is required that optical transmission loss (optical attenuation) of an optical signal be reduced to cause the optical signal to be transmitted through the optical waveguide.

Figure 15:
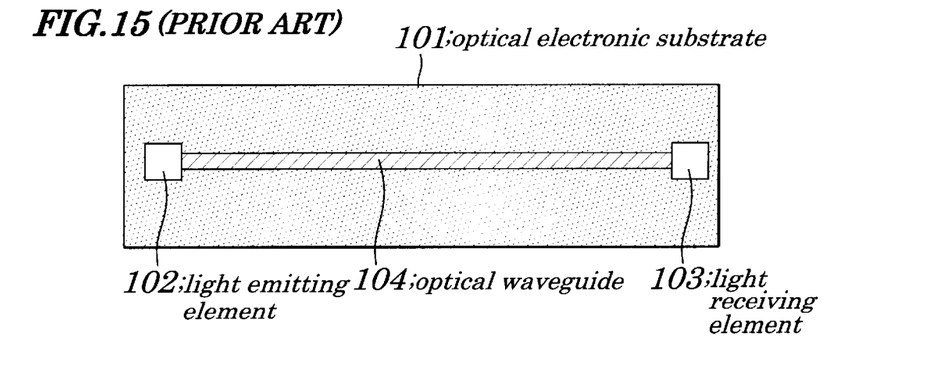
FIG. 15 is a schematic top view showing configurations of a conventional optical module.

FIG. 15 is a schematic top view showing configurations of a conventional optical module. In the conventional optical module, as shown in FIG. 15, a light emitting element 102 such a laser diode and a light receiving element 103 such a photodiode or a like are mounted on an optical electronic substrate 101 made up of a semiconductor substrate or a like and the light emitting element 102 is optically coupled to the light receiving element 103 through an optical waveguide 104 formed on an optical electronic substrate 101. As a material for the optical waveguide 104, conventionally, a glass material exhibiting small optical transmission loss is preferably used. The glass material, since its optical transmission loss is as small as about 0.01 dB (decibels)/cm, exhibits an excellent optical transmission characteristic.

However, the glass material has a drawback in machinability or processability, that is, the glass material is not suitable for microfabrication and it is difficult to apply the glass material to an optical waveguide with a comparatively large length, such as the waveguide being 10 cm or longer. Therefore, use of the optical waveguide made of the glass material is limited to applications where the optical waveguide, even when its lenghth is small, can provide much usefulness.

From a viewpoint described above, an organic resin made from, for example, polyimide tends to be used widely as the material for the optical waveguide having excellent processibility or machinability. When such an organic material for the optical waveguide is employed, by making the most of its excellent machinability or processibility, it is possible to implement an optical module in which the optical waveguide is mounted in a comparatively small space on an optical electronic substrate.

However, the conventional optical module has a problem even if it uses such the organic material. Though the optical waveguide with a comparatively large length can be formed by using such the organic material being excellent in the machinability or processibility, it has a defect in that optical transmission loss on the optical waveguide made up of the organic material is large, which makes it difficult to be applied to practical use. In the case of formation of the optical waveguide by using, for example, polyimide, since the polyimide provides the optical transmission loss of about 0.3 dB/cm, when the optical waveguide being, for example, 10 cm long formed by using the polyimide is used, an amount of light having passed through the optical waveguide is attenuated to a half. Moreover, an amount of the light having passed through the optical waveguide being 30 cm long attenuates to about one tenth.

SUMMARY OF THE INVENTION

In view of the above, it is an object of the present invention to provide an optical module and its manufacturing method which are capable of forming an optical waveguide by making the most of characteristics of a material exhibiting small optical transmission loss and having excellent machinability or processibility.

According to a first aspect of the present invention, there is provided an optical module for optically coupling a first optical waveguide constructed using a first film in which a core layer is coated with a clad layer and a second optical waveguide constructed using a second film in which a core layer is coated with a clad layer, including:

an optical waveguide sheet having the first optical waveguide in which the first film is bonded to a base substrate with a metal layer interposed between the first film and the base substrate and in which an aperture portion is formed in a desired region of the first film; and an optical component having a second optical waveguide in which the core layer in the second film is formed in a parabolic shape;

wherein the optical component is placed in the aperture portion in the optical waveguide sheet and wherein an end face of a large diameter portion in the parabolic-shaped core layer in the optical component is disposed so as to be opposite to an end face of the core layer in the first optical waveguide in the optical waveguide sheet so that the first optical waveguide and the second optical waveguide are optically coupled to each other.

According to a second aspect of the present invention, there is provided an optical module for optically coupling a first optical waveguide constructed using a first film in which first and second faces of a core layer are coated respectively with a first clad layer and a second clad layer and a second optical waveguide constructed using a second film in which first and second faces of a core layer are coated respectively with a first clad layer and a second clad layer, including:

an optical waveguide sheet having a first optical waveguide in which the first film is bonded to a base substrate with a metal layer interposed between the first film and the base substrate and in which an aperture portion is formed in a desired region of the first film where the metal layer is exposed;

an optical component having a second optical waveguide in which the core layer in the second film is formed in a parabolic shape;

wherein the optical component is placed in the aperture portion in the optical waveguide sheet and wherein an end face of a large diameter portion in the parabolic-shaped core layer in the optical component is disposed so as to be opposite to an end face of the core layer in the first optical waveguide in the optical waveguide sheet so that the first optical waveguide and the second optical waveguide are optically coupled to each other.

In the foregoing, a preferable mode is one wherein the core layer of the first optical waveguide and the core layer of the second optical waveguide are formed so that heights of the core layer in the first optical waveguide and of the core layer in the second optical waveguide are same on the base substrate.

According to a third aspect of the present invention, there is provided an optical module for optically coupling a first optical waveguide constructed using a first film in which a core layer is coated with a clad layer and a second optical waveguide constructed using a second film in which a core layer is coated with a clad layer, including:

an optical waveguide sheet having a first optical waveguide in which the first film is bonded to a base substrate with a metal layer interposed between the first film and the base substrate and in which an aperture portion is formed in a desired region of the first film where the core layer is exposed;

an optical component having a second optical waveguide in which the core layer in the second film is formed in a parabolic shape and in which a thin film layer is formed so that the core layer in the second film is coated with the thin film layer; and wherein the optical component is placed in the aperture portion in the optical waveguide sheet wherein the core layer in the optical waveguide of the optical component is disposed so as to be opposite to the core layer in the first optical waveguide in the optical waveguide sheet with the thin film being interposed between the core layer in the first optical waveguide and the core layer in the second optical waveguide so that the first optical waveguide and the second optical waveguide are optically coupled to each other.

In the foregoing, a preferable mode is one wherein the clad layer of the first film is made up of a first clad layer and a second clad layer which cover first and second faces of the core layer respectively.

Also, a preferable mode is one wherein the second clad layer, the core layer and the first clad layer are made up of an organic resin.

Also, a preferable mode is one wherein the second clad layer is made of a glass material and wherein the core layer and first clad layer are made of an organic resin.

Also, a preferable mode is one wherein the first clad layer is made of an organic resin and the core layer and second clad layer are made of a glass material.

Also, a preferable mode is one wherein a first wiring pattern is formed on the base substrate in the optical waveguide sheet while a second wiring pattern corresponding to the first wiring pattern is formed in the optical component wherein the first wiring pattern and the second wiring pattern are connected to each other.

Also, a preferable mode is one that wherein includes an optical fiber binding component, instead of the optical component, wherein the optical fiber binding component is disposed in the aperture portion in the optical waveguide sheet and wherein the second optical waveguide in the optical fiber binding component is disposed so as to be opposite to the first optical waveguide in the optical waveguide sheet so that the first optical waveguide and the second optical waveguide are optically coupled.

Also, a preferable mode is one wherein specular treads are formed at midpoints of an optical path in the first optical waveguide which are used to totally reflect light and to change a direction of the optical path to a perpendicular direction.

Also, a preferable mode is one wherein an end face of a large diameter portion of the core layer in the second optical waveguide is disposed so as to be opposite to an end of the core layer in the first optical waveguide in a state being inclined relative to an optical axis.

According to a fourth aspect of the present invention, there is provided a method for manufacturing an optical module for optically coupling a first optical waveguide and a second optical waveguide, including:

a first process of forming an optical waveguide sheet by bonding a first film in which a first face and a second face of a core layer made of an organic resin are coated respectively with a first clad layer and a second clad layer made of an organic resin to a base substrate with a metal layer being interposed between the first film and the base substrate;

a second process of forming a first optical waveguide by performing abrasion processing using ultraviolet laser at a desired region of the first film in the optical waveguide sheet to form an aperture portion with the metal layer being exposed; and a third process of mounting an optical component having a second optical waveguide formed in a manner that a core layer in a second film has a parabolic shape in the aperture portion and placing an end face of a large diameter portion of the core layer having the parabolic shape in the optical component so as to be disposed opposite to an end face of the core layer in the first optical waveguide in the optical waveguide sheet.

According to a fifth aspect of the present invention, there is provided a method for manufacturing an optical module for optically coupling a first optical waveguide and a second optical waveguide to each other, including:

a first process of forming an optical waveguide sheet by bonding a first film in which a first face and a second face of a core layer made of an organic resin are coated respectively with a first clad layer and a second clad layer made of a glass material to a base substrate with a metal layer being interposed between the first film and the base substrate;

a second process of forming a first optical waveguide by performing abrasion processing using ultraviolet laser at a desired region of the first film in the optical waveguide sheet to form an aperture portion with the second clad layer being exposed; and a third process of mounting an optical component having a second optical waveguide formed in a manner that a core layer in a second film has a parabolic shape in the aperture portion and placing an end face of a large diameter portion of the core layer having the parabolic shape in the optical component so as to be disposed opposite to an end face of the core layer in the first optical waveguide in the optical waveguide sheet.

According to a sixth aspect of the present invention, there is provided a method for manufacturing an optical module for optically coupling a first optical waveguide and a second optical waveguide to each other, including:

a first process of forming an optical waveguide sheet by bonding a first film in which a first face and a second face of a core layer made of a glass material are coated respectively with a first clad layer made of an organic resin and a second clad layer made of a glass material to a base substrate with a metal layer being interposed between the first film and the base substrate;

a second process of forming a first optical waveguide by performing abrasion processing using ultraviolet laser at a desired region of the first film in the optical waveguide sheet to form an aperture portion with the core layer being exposed; and a third process of mounting an optical component having a second optical waveguide in which a core layer of the second film is formed so as to have a parabolic shape and a thin film layer formed so as to cover the core layer of the second optical waveguide in the aperture portion and placing the core layer of the second optical waveguide so as to be disposed opposite to the core layer in the first optical waveguide in the optical waveguide sheet.

With above configurations, the first optical waveguide is formed using small optical transmission loss and the second parabolic-shaped optical waveguide is formed by using a material being excellent in machinability and processibility and the first optical waveguide and the second optical waveguide are optically coupled and, therefore, even when the optically-coupled waveguide being comparatively long is formed, it is possible to reduce optical transmission loss to a degree to which no practical inconvenience is produced. As a result, the optically-coupled waveguide can be formed by making the most of characteristics of materials having small optical transmission loss and excellent machinability or processibilty.

BRIEF DESCRIPTION OF THE DRAWINGS

The above and other objects, advantages, and features of the present invention will be more apparent from the following description taken in conjunction with the accompanying drawings in which.

DETAILED DESCRIPTION OF THE PREFERRED EMBODIMENTS

Best modes of carrying out the present invention will be described in further detail using various embodiments with reference to the accompanying drawings.

First Embodiment

Figure 1:
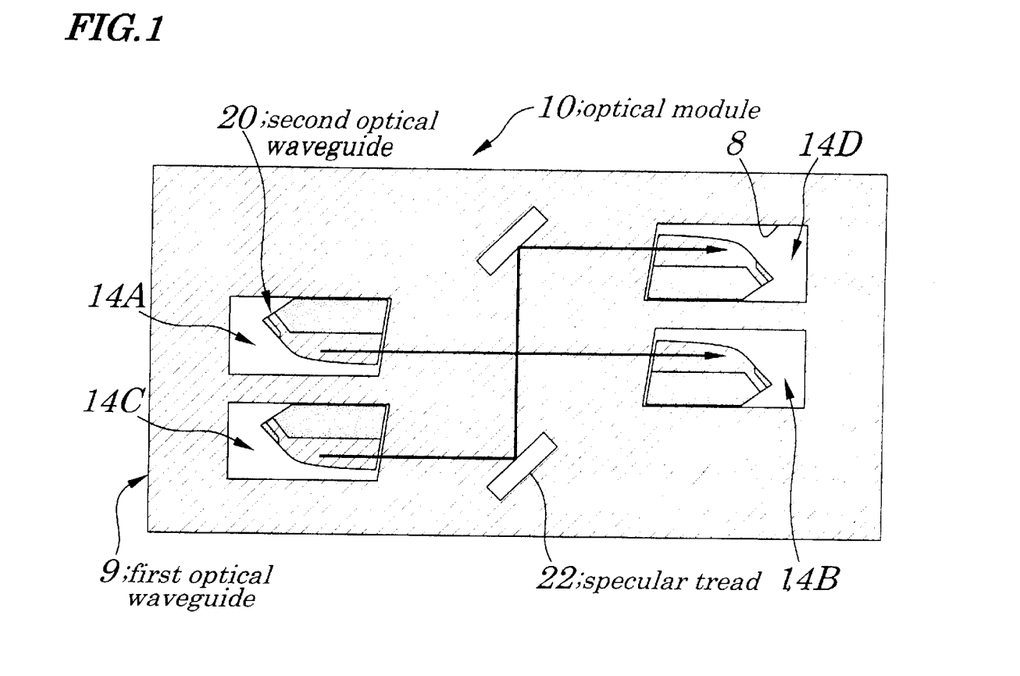
FIG. 1 is a top view showing configurations of an optical module according to a first embodiment of the present invention.
Figure 2:
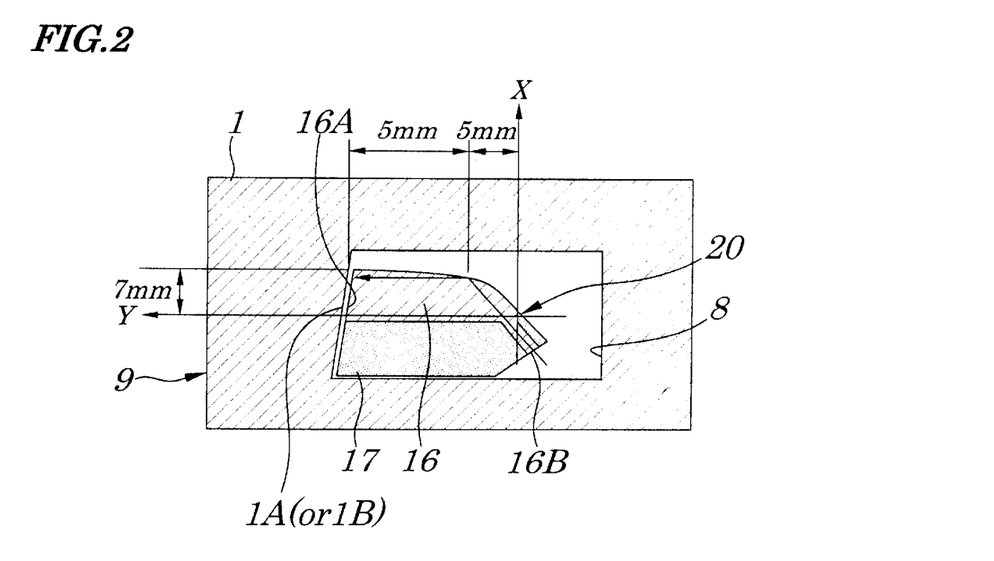
FIG. 2 is an expanded top view showing configurations of part of the optical module of FIG. 1.
Figure 3A:
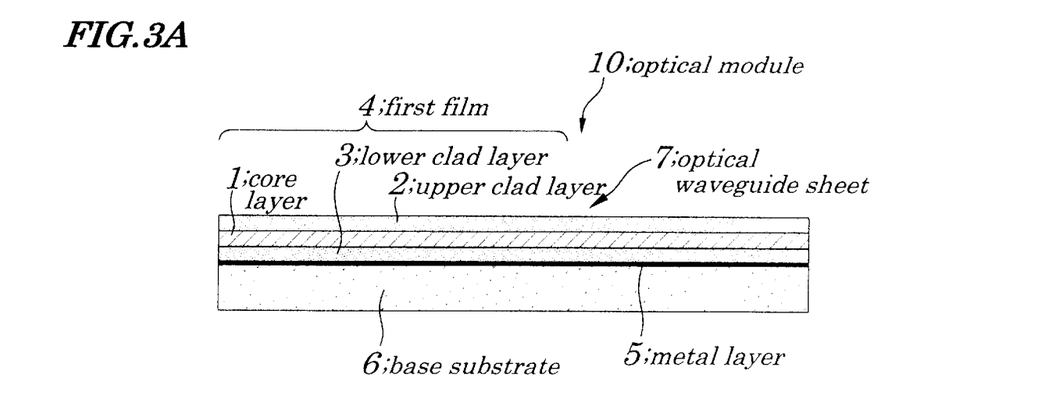
FIGS. 3A, 3B and 3C are process diagrams illustrating a method of manufacturing the optical module of FIG. 1 in order of processes.
Figure 3B:
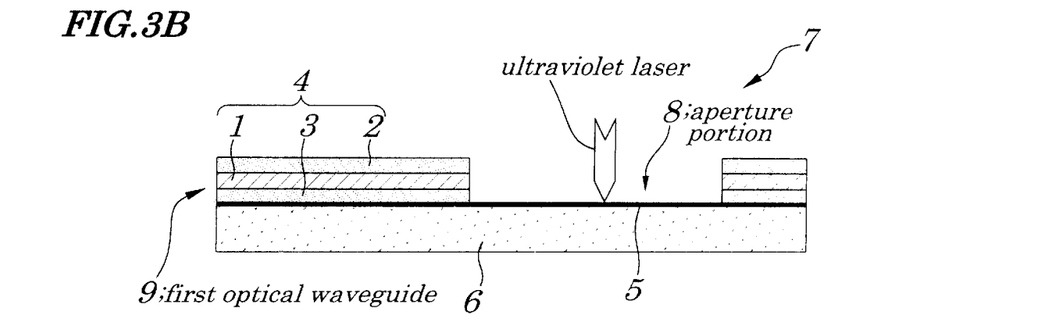
Figure 3C:
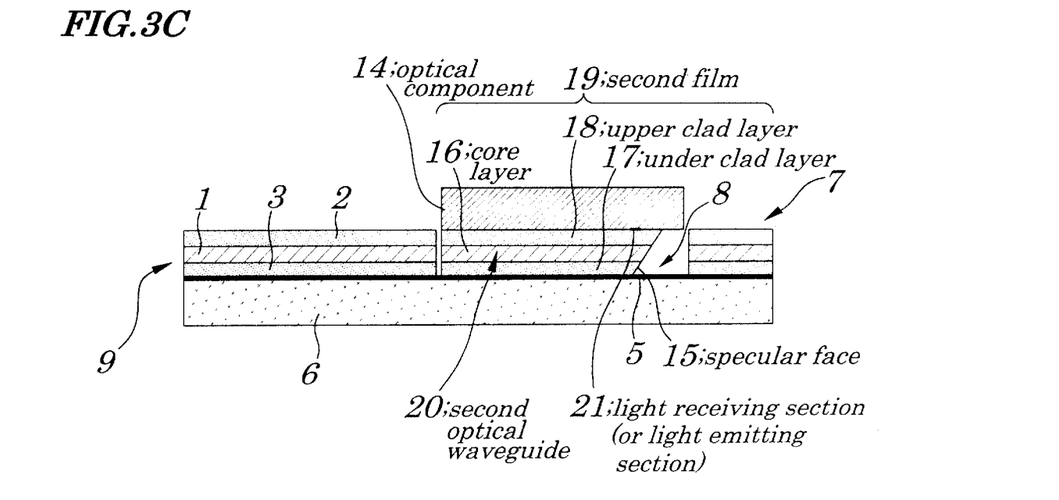

FIG. 1 is a top view showing configurations of an optical module according to a first embodiment of the present invention. FIG. 2 is an expanded top view showing configurations of part of the optical module of FIG. 1. FIGS. 3A, 3B, and 3C are manufacturing process diagrams illustrating a method of manufacturing the optical module of FIG. 1 in order of processes. An optical module 10, as shown in FIG. 1 to FIG. 3C, includes an optical waveguide sheet 7 having a first optical waveguide 9 in which a first film 4 is bonded to a base substrate 6 with a metal layer 5 being interposed between the first film 4 and the base substrate 6 and an optical component 14 having a second optical waveguide 20 in which a core layer 16 in a second film 19 is formed in a parabolic form, wherein the optical component 14 is placed in an aperture portion 8 in the optical waveguide sheet 7 and an end face of a large diameter portion 16A of a core layer 16 in the second optical waveguide 20 in the optical component 14 is disposed so as to be opposite to an end face 1A of the core layer 1 in the first optical waveguide 9 in the optical waveguide 7 so that the first optical waveguide 9 and the second optical waveguide 20 are optically coupled.

The first optical waveguide 9 includes a core layer 1 made of organic resin such as a methylphenyl polysilane resin, polycarbonate resin, chlorotrifluoethylene polymer, norbornane resin, polysiloxane resin, or a like, all of which have small optical transmission loss, and an upper clad layer 2 and a lower clad layer 3 respectively covering upper and lower faces of the core layer 1 made up of such the organic resin as described above. The second optical waveguide 20 includes the core layer 16 made of the organic resin or a glass material, an upper clad layer 17 and a lower clad layer 18. Each of core layers 1 and 16 is constructed so as to have a reflactive index being higher than the upper clad layers 2 and 17, and the lower clad layers 3 and 18. Each of the lower clad layers 2 and 17, and the upper clad layers 3 and 18 is so formed as to have a film thickness of about 20 $\mu$m. Moreover, each of the core layers 1 and 16 is constructed so as to have about 10 $\mu$m in the case of a single mode and 50 $\mu$m in the case of a multi-mode.

The first optical waveguide 9 is bonded to the base substrate 6 with a metal layer 5 made of metal such as Al (Aluminum), Cu (Copper), or a like being interposed between the first optical waveguide 9 and the base substrate 6 and is formed on all surfaces other than the aperture portion 8, which forms a so-called slab optical waveguide. The metal layer 5, as described later, serves as a stopper to protect a non-processed portion while ultraviolet laser processing is being performed and as a unit to disperse heat when excessive heat is applied during manufacturing processes. The base substrate 6 is made from an organic resin or a like and, as the base substrate 6, a printed wiring substrate on which a metal pattern for wiring, via-hole metal, or a like is formed and a solder resist is applied and/or a character pattern, or a like is printed, can be used. Moreover, specular treads 22 are formed, as shown in FIG. 1, at midpoints in an optical path on the first optical waveguide 9, which are used to totally reflect light and changes a direction of an optical path to a perpendicular direction.

The optical component 14 is made up of a semiconductor substrate on which a light receiving element, light emitting element or a like is formed and a light receiving section 21 (or light emitting section) is mounted in a desired region of a surface of the optical component 14. Moreover, a specular face 15 having an angle of approximately 45 degrees relative to an optical axis used to change a direction of an optical path through which light passes to a vertical direction is formed in an end portion in the second optical waveguide 20 corresponding to the light receiving section 21. The core layer 16 in the second optical waveguide 20, as shown in FIG. 2, is formed so as to have a parabolic shape and has the large diameter portion 16A in one end portion and a small diameter portion 16B in another end portion, and its side faces are exposed. An end face of the core layer 16 is disposed so as to be opposite to the end face 1A of the core layer 1 in the first optical waveguide 9. Direct contact between these two faces being disposed opposite to each other are not required or may be bonded by an appropriate adhesive. Since light whose width has been converged to a narrow one by the small diameter portion 16B of the core layer 16 travels toward a direction of the large diameter portion 16A, the light is changed to the parallel light due to an action of the large diameter portion 16A and then enters the first optical waveguide 9. Conversely, since a parallel light having a large width that has entered the large diameter portion 16A travels toward the small diameter portion 16B, the parallel light goes forward with the width of the parallel light having been converged to a small width due to an action of the small diameter portion 16B. One example of dimensions of each portion in the second optical waveguide 20 is shown in FIG. 2. Here, an expression to show a parabolic shape is given by $Y (mm)=X^2/(5 mm)$ Preferably, the end face of the large diameter portion 16A in the core layer 16 in the second optical waveguide 20 and the end face 1A of the core layer 1 in the first optical waveguide 9 are disposed so as to be opposite to each other in a manner that these faces are inclined several degrees relative to the optical axis. The reason is that, if these faces are not inclined, when feedback light is produced due to surface reflection at faces being disposed opposite to each other, the feedback light moves backward through the optical path, causing an occurrence of noise. From this point of view, when these faces are disposed so as to be opposite to each other and inclined relative to the optical axis, even if the feedback light is produced, a direction in which the feedback light travels can be deviated from the optical path, thereby enabling prevention or reduction of effects caused by the noise. In this case, an inclination θ to be employed in the above state varies depending on a refractive index of a compositional medium of each optical waveguide 9 and 20, however, if an ordinal medium having the refractive index of about 1.5, the inclination angle "θ" should be within a range between a value being an inclination angle "θ1" represented by an expression that the inclination angle "θ1"≈λ/w (rad) or more and a value being an inclination angle "θ2" (about 40 degrees) or less, where W denotes a width of the above large diameter portion 16A.

Thus, in the optical module 10 of the embodiment, the first optical waveguide 9 is formed by using a material having small optical transmission loss and the (parabolic-shaped) second optical waveguide 20 is formed by selecting a material having excellent in machinability or processiblity and then the first optical waveguide 9 and the second optical waveguide 20 are optically coupled to each other and therefore can be formed by making the most of characteristics of the material having small optical transmission loss and being excellent in machinability or processibility. As a result, even when the first optical waveguide 9 or second optical waveguide 20 having a large length of being, for example, 10 cm or more is formed, the optical transmission loss can be reduced to a degree to which inconvenience is not produced from a view point of practical use.

Next, a method for manufacturing the optical module 10 is described by referring to FIGS. 3A, 3B, and 3C. As shown in FIG. 3A, the optical waveguide sheet 7 is produced by bonding a first film 4 in which the upper and lower faces of the core layer 1 made from the organic resin, such as a methylphenyl polysilane resin, polycarbonate resin, chlorotrifluoethylene polymer, norbornane resin, polysiloxane resin, or a like, all of which have small optical transmission loss, are coated, respectively, with the upper clad layer 2 and the lower clad layer 3 both being made from such the organic resin as described above and having a refractive index being smaller than that of the core layer 1, to the base substrate 6, with the metal layer 5 such as Al, Cu or a like being interposed between the first film 4 and the base substrate 6. Each of the lower clad layer 3 and upper clad layer 2 in the first film 4 is so formed as to have a film thickness of about 20 μm. Moreover, the core layer 1 is constructed so as to have about 10 μm in the case of a single mode and 50 μm in the case of a multi-mode.

Next, the first optical waveguide 9 is formed, as shown in FIG. 3B, in a manner that the aperture portion 8 in which the metal layer 5 is exposed is formed by performing abrasion processing selectively in a desired region (in which the optical component 14 is to be mounted) of the first film 4 in the optical waveguide sheet 7 by using ultraviolet laser to sequentially remove the upper clad layer 2, core layer 1 and lower clad layer 3. In this case, the metal layer 5 serves as a stopper against the ultraviolet laser. To form such the aperture portion 8 selectively, the ultraviolet laser may be applied with a portion not to be processed in the first film 4 being pre-coated with a metal mask. Alternatively, a place in which ultraviolet laser light from a harmonic YAG (Yttrium Aluminum Garnet) laser is applied may be controlled by using a galvanometer mirror or a like.

Then, as shown in FIG. 3C, the optical component 14 having the second optical waveguide 20 formed by forming, in advance, the core layer 16 in the second film 19 so as to have the parabolic shape is placed in the aperture portion 8 in the optical waveguide sheet 7. To the optical component 14 is bonded a second film 19 in which upper and lower surfaces of the core layer 16 made from an organic resin, glass, or a like are coated respectively with the upper clad layer 17 and the lower clad layer 18 both being made up of the same materials as for the core layer 16 and each having a refractive index being smaller than that of the core layer 16. The core layer 16, as shown in FIG. 2, has the large diameter portion 16A and the small diameter portion 16B and the end face of the large diameter portion 16A is disposed so as to be opposite to the end face 1A of the core layer 1 in the first optical waveguide 9. Moreover, in a desired region on a surface of the optical component 14 is formed a light receiving section 21 (or light emitting section) and in an end portion in the second optical waveguide 20 corresponding to the light receiving section 21 is formed a specular face 15 having an angle of about 45 degrees formed relative to an optical axis, which is used to change a direction of an optical path of light passing through the core layer 16 to a vertical direction. Therefore, the manufacturing of the optical module 10 of the embodiment is completed by mounting the optical component 14 described above in the aperture portion 8 and by causing the end face of the (parabolic-shaped) large diameter portion 16A of the core layer 16 in the second optical waveguide 20 to be disposed opposite to the end face 1A of the core layer 1 in the first optical waveguide 9 in the optical waveguide sheet 7.

Next, operations of the optical module 10 of the embodiment will be described.

In FIG. 1, parallel light with a large width which has entered from the end face of the large diameter portion 16A of the core layer 16 in the second optical waveguide 20 in a first optical component 14A to the end face 1A of the core layer 1 in the first optical waveguide 9, with its luminous flux being maintained, after having passed through a first path in the first optical waveguide 9 as shown by arrows, enters from another end face 1B of the core layer 1 to the end face of the large diameter portion 16A of the core layer 16 in a second optical waveguide 20 in the second optical component 14B. Then, the parallel light, after a width of the parallel light has been converged to a small width by the small diameter portion 16B in the core layer 16, enters the light receiving device (not shown) from the light receiving section 21.

Similarly, in FIG. 1, parallel light with a large width which has entered from the end face of the large diameter portion 16A of the core layer 16 in the second optical waveguide 20 in a third optical component 14C to the end face 1A of the core layer 1 in the first optical waveguide 9, with its luminous flux being maintained, after having passed through a second path in the first optical waveguide 9 as shown by arrows, reaches one of the specular treads 22 mounted at midpoints in the optical path and is totally reflected by the specular tread 22, resulting in a change of the direction of the optical path to a perpendicular direction. Then, after a direction of the second optical path has been changed so that the first path and second path intersect at right angles, the parallel light reaches another of the specular treads 22 and is again totally reflected and then passes through the second path being parallel to the first path and finally enters the end face in the large diameter portion 16A of the core layer 16 in the second optical waveguide 20 in a fourth optical component 14D. The parallel light, after its width has been converged to a smaller one by the small diameter portion 16B in the core layer 16, enters the light receiving device (not shown) from the light receiving section 21.

Thus, even if the light travels on a same optical waveguide, since a plurality of pieces of light goes forward in different directions, each of the plurality of pieces of light can travel independently with the occurrence of interference, which enables the plurality of pieces of light in a multiple manner.

According to the optical module 10 of the embodiment, since the first optical waveguide 9 is bonded to the base substrate 6 with the metal layer 5 being interposed therebetween, even in the case where heat treatment has to be performed on the optical waveguide sheet 7 at a temperature exceeding a glass transition temperature due to such a reason for mounting components in the first optical waveguide 9, excessive heat is transferred to the metal layer 5 and is dispersed in an environment, which can prevent the resin making up the first optical waveguide 9 from melting due to influences of heat and, as a result, heat resistance of the resin or resistance of the resin in a cycle of heating process can be improved. Moreover, if a resin having a high heat resistance is used as the resin making up the first optical waveguide 9, the use of the metal layer 5 is not required. In this case, it is possible to have the metal pattern for wiring formed on the base substrate 6 act as a stopper while laser processing is being performed. Moreover, a surface of the first optical waveguide 9 may be coated with a resin having a higher heat-resistance for protection of the first optical waveguide 9.

According to the first embodiment, following effects can be obtained.

(1) Since the first optical waveguide 9 to be formed on the optical waveguide sheet 7 is formed on all the surfaces of the optical waveguide sheet 7 except for surfaces to be used for the aperture portion 8, no formation of the optical waveguide pattern using pattern transfer technology is required and, therefore, the first optical waveguide 9 can be formed using the material exhibiting small optical transmission loss without considerations given to machinability or processibility of the material.

(2) In the case where the material exhibiting small optical transmission loss but having low heat resistance has to be used, even if heat treatment is performed at a temperature exceeding a glass transition point, since excessive heat can be dispersed by the metal layer 5, influences by heat can be reduced and therefore reliability in the first optical waveguide 9 can be improved.

(3) Since it is possible to make a plurality of pieces of light travel through the first optical waveguide 9 formed on the optical waveguide sheet 7 in different directions without being interfered by each other and in a multiple manner, design of the optical path can be made easy.

(4) Since there exists no optical waveguide causing the optical path to be bent, free design of the optical path is made possible without inconvenience in the design of the optical path that a travelling position of the optical path is limited by a curvature of the optical path.

Second Embodiment

Figure 4:
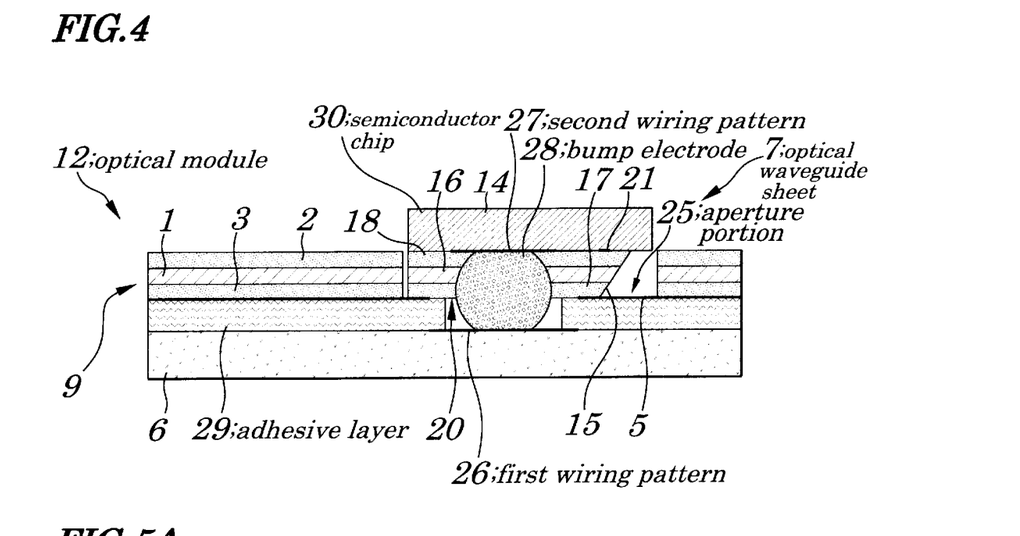
FIG. 4 is a cross-sectional view showing configurations of an optical module according to a second embodiment of the present invention.
Figure 5A:
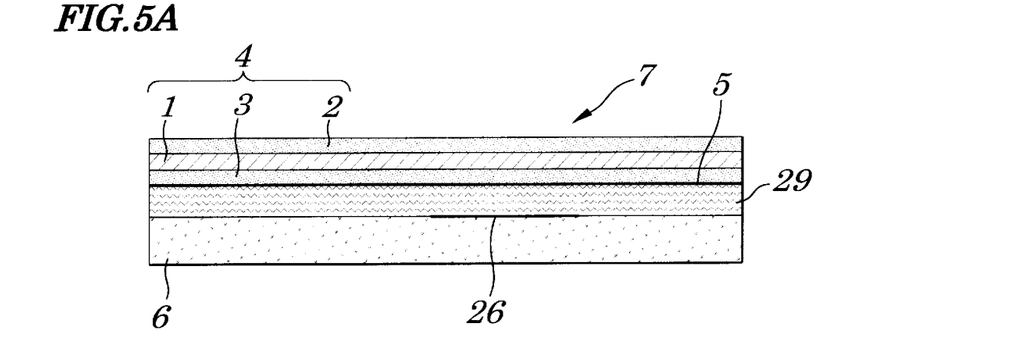
FIGS. 5A and 5B are process diagrams illustrating a method for manufacturing the optical module in order of processes employed in the second embodiment of the present invention.
Figure 5B:
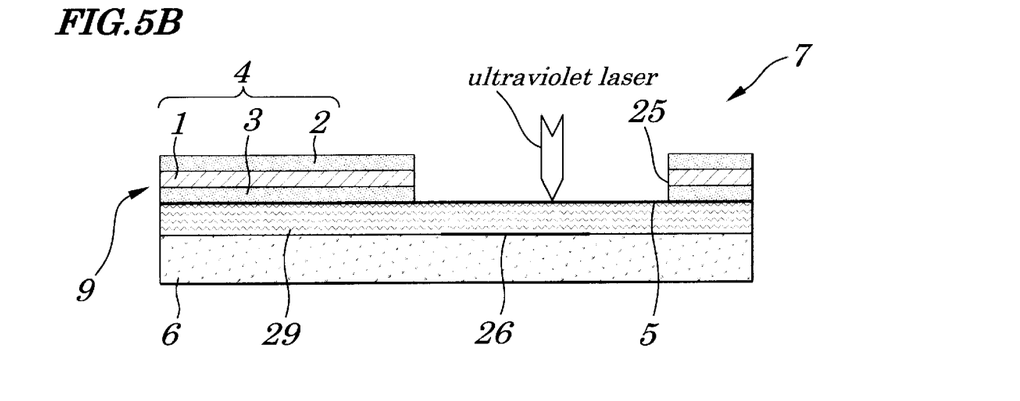

FIG. 4 is a cross-sectional view showing configurations of an optical module according to a second embodiment of the present invention. FIGS. 5A and 5B are diagrams illustrating a method for manufacturing the optical module in order of processes employed in the second embodiment of the present invention. Configurations of the optical module of the second embodiment differ from those in the first embodiment in that a first wiring pattern is formed on a base substrate and a second wiring pattern corresponding to the first wiring pattern is formed in a manner that the first and second wiring patterns are connected to each other.

In the optical module of the second embodiment, as shown in FIG. 4, a first wiring pattern 26 is formed on a base substrate 6 serving as the printed wiring substrate of an optical waveguide sheet 7 while a second wiring pattern 27 corresponding to the first wiring pattern 26 is formed on a semiconductor chip 30 serving as an optical component 14 and the first wiring pattern 26 and the second wiring pattern 27 are connected to each other via a bump electrode 28. Configurations other than those described above are approximately the same as those in the first embodiment and, therefore, in FIG. 4, same reference numbers are assigned to corresponding parts in FIGS. 1 to 3c and descriptions of them are omitted accordingly.

Next, the method for manufacturing an optical module 12 will be described in order of processes by referring to FIG. 5A to FIG. 6B.

First, as shown in FIG. 5A, a first film 4 is prepared in which an upper surface and a lower surface of a core layer 1 made up of an organic resin, such as a methylphenyl polysilane resin, polycarbonate resin, chlorotrifluoethylene polymer, norbornane resin, polysiloxane resin, or a like, all of which exhibit small optical transmission loss, are coated respectively with an upper clad layer 2 and a lower clad layer 3 both being made up of such an organic resin as those used for the core layer 1 and each having a refractive index being lower than that of the core layer 1, and the base substrate 6 is prepared in which a first wiring pattern is formed in a desired region. Next, the first film 4 is bonded to the base substrate 6 with a metal layer 5 and an adhesive layer 29 interposed between the first film 4 and the base substrate 6.

Next, as shown in FIG. 5B, a first optical waveguide 9 is formed by sequentially removing the upper clad layer 2, core layer 1, and lower clad layer 3 by selective abrasion processing using ultraviolet laser performed in a desired portion (on which the semiconductor chip 30 serving as the optical component 14 is to be mounted) in the first film 4 in an optical waveguide sheet 7 and by forming an aperture portion 25 in which the metal layer 5 is exposed. In this case, the metal layer 5 serves as a stopper against the ultraviolet laser.

Figure 6A:
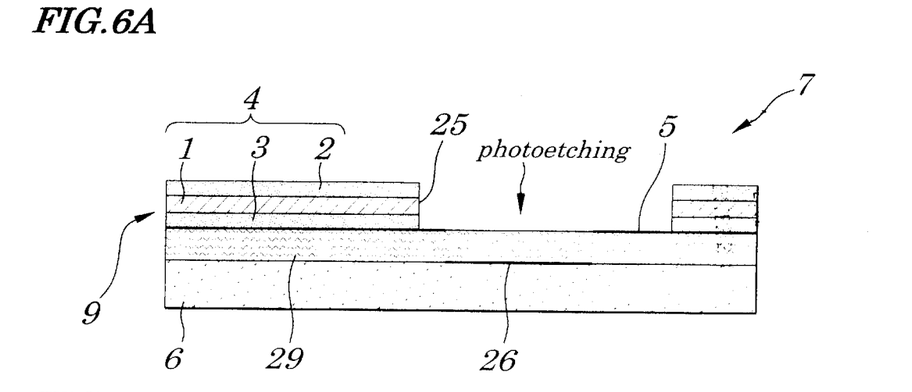
FIGS. 6A and 6B are process diagrams illustrating the method for manufacturing the optical module in order of processes employed in the second embodiment of the present invention.
Figure 6B:
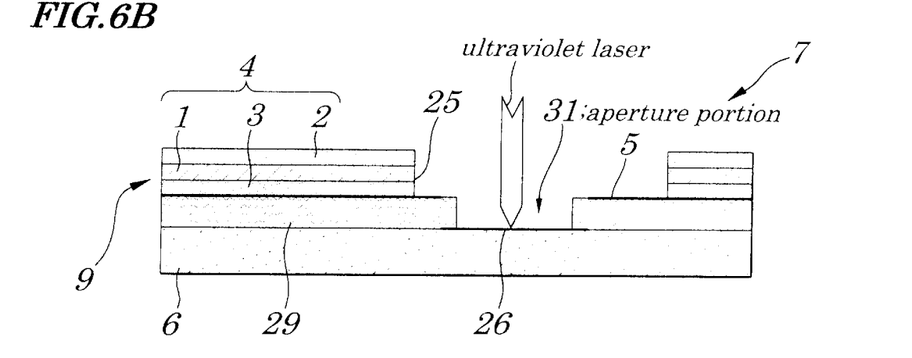

Next, as shown in FIG. 6B, by selectively removing the metal layer 5, which is put into an exposed state due to formation of the aperture portion 25, in the desired portion using photoetching technology, the adhesive layer 29 is exposed.

Then, as shown in FIG. 6B, by performing abrasion processing using ultraviolet laser in a desired portion (on which the bump electrode 28 is to be mounted) of the adhesive layer 29 in the optical waveguide sheet 7 to remove part of the adhesive layer 29, an aperture portion 31 is formed and the first wiring pattern 26 is exposed. In this case, the first wiring pattern 26 serves as the stopper against the ultraviolet laser.

Next, as analogous with FIG. 4, the semiconductor chip 30 serving as the optical component 14 made up of a second optical waveguide 20 formed, in advance, by mounting a core layer 16 in the second film 19 in a manner that an end face of the core layer 16 has a parabolic shape and of the second wiring pattern 27 formed in the desired region of the semiconductor chip 30 is placed in the aperture portion 25. Then, the first wiring pattern 26 disposed in the aperture portion 31 is put into contact with the second wiring pattern 27 by applying heat to the bump electrode 28 to partially melt it and by pushing the second wiring pattern 27 in the semiconductor chip 30 against the bump electrode 28. In this case, as in the case of the first embodiment, the core layer 16 is placed in a manner that an end face of the large diameter portion 16A of the core layer 16 is disposed opposite to the end face 1A of the core layer 1 in the first optical waveguide 9. Thus, the manufacturing of the optical module 12 is completed as shown in FIG. 4.

According to the second embodiment, in addition to effects obtained in the first embodiment, following effects can be achieved.

The second wiring pattern 27 in the semiconductor chip 30 serving as the optical component 14 can be connected to the first wiring pattern 26 of the base substrate 6 serving as the printed wiring substrate and heights of the first optical waveguide 9 and second optical waveguide 20 are matched to each other.

Third Embodiment

Figure 7:
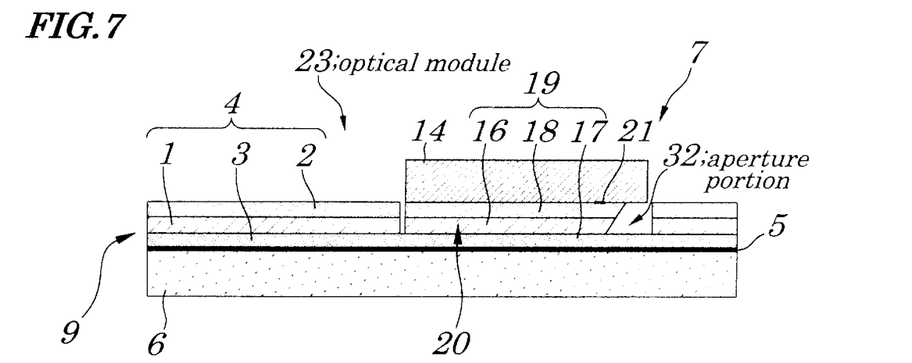
FIG. 7 is a cross-sectional view showing configurations of an optical module according to a third embodiment of the present invention.
Figure 8A:
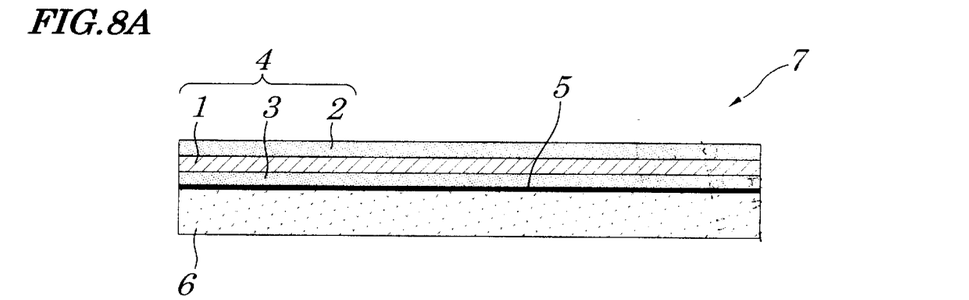
FIGS. 8A and 8B are process diagrams illustrating a method for manufacturing the optical module in order of processes employed in the third embodiment of the present invention.
Figure 8B:
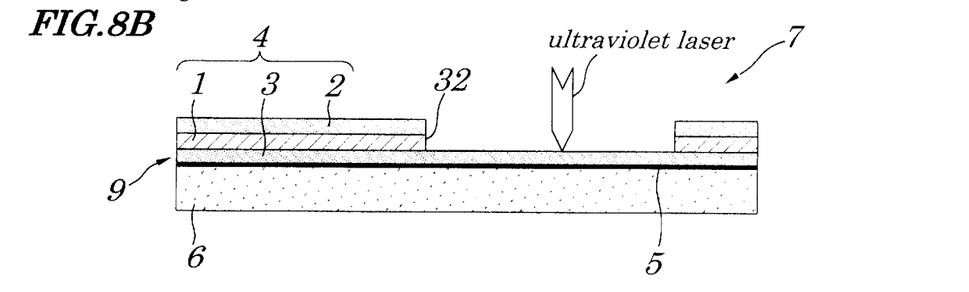

FIG. 7 is a cross-sectional view showing configurations of an optical module according to a third embodiment of the present invention. FIGS. 8A–8B are diagrams illustrating a method for manufacturing the optical module in order of processes employed in the third embodiment of the present invention. Configurations of an optical module 23 differ from those in the first embodiment in that an aperture portion 32 is formed in a manner that a lower clad layer 17 in the second optical waveguide 20 is exposed. That is, the optical module 23 of the third embodiment is so constructed, as shown in FIG. 7, that the aperture portion 32 to be mounted in the second optical waveguide 20 in an optical waveguide sheet 7 is formed in a manner that the lower clad layer 17 is exposed.

In the aperture portion 32 are placed an optical component 14 and the second optical waveguide 20 made up of a core layer 16 and an upper clad layer 18, and an end face of a large diameter portion 16A in the core layer 16 having a parabolic shape is disposed opposite to an end face 1A of the core layer 1 of a first optical waveguide 9 in the optical waveguide sheet 7. Configurations other than those described above are approximately the same as those in the first embodiment and, therefore, in FIG. 7, same reference numbers are assigned to corresponding parts in FIGS. 1 to 3 and descriptions of them are omitted accordingly.

Next, a method for manufacturing the optical module 23 is described by referring to FIGS. 8A and 8B. As shown in FIG. 8A, the optical waveguide sheet 7 is produced by bonding a first film 4 in which upper and lower faces of the core layer 1 made from organic resin such as a methylphenyl polysilane resin, a polycarbonate resin, chlorotrifluoethylene polymer, norbornane resin, polysiloxane resin, or a like, all of which have small optical transmission loss, are coated, respectively, with an upper clad layer 2 made from organic resins described above and having a refractive index being lower than that of the core layer 1 and a lower clad layer 3 made from a glass material and having a refractive index being lower than that of the core layer 1, to a base substrate 6, with a metal layer 5 such as Al, Cu, or a like being interposed between the first film 4 and the base substrate 6.

Next, as shown in FIG. 8B, the first optical waveguide 9 is formed by sequentially removing the upper clad layer 2, core layer 1, and lower clad layer 3 by selective abrasion processing using ultraviolet laser performed in a desired region (on which a semiconductor chip 30 serving as the optical component 14 is to be mounted) of the first film 4 in the optical waveguide sheet 7 and by forming an aperture portion 32 in which the lower clad layer 3 is exposed. In this case, the metal layer 5 serves as a stopper against the ultraviolet laser.

Then, after the same processing as that in the first embodiment shown in FIG. 3C has been performed, in the aperture portion 32, the optical component 14 (which is equivalent to the optical component 14 in FIG. 7) having the second optical waveguide 20 formed by, in advance, forming the core layer 16 in a second film so as to have a parabolic shape and by coating a lower face of the core layer 16 with a lower clad layer 17, is placed, and the end face of the large diameter portion 16A is disposed opposite to the end face 1A of the core layer 1 in the first optical waveguide 9 so that the manufacturing of the optical module 23 as shown in FIG. 7 is completed.

In this case, only by placing the core layer 16 of the second optical waveguide 20 in the optical component 14 so that the core layer 16 is directly contacted with the lower clad layer 3 in the first optical waveguide 9, the core layers 1 and 16 are maintained at the same height, thus enabling optical coupling.

According to the third embodiment of the present invention, in addition to effects obtained in the first embodiment, following effects can be achieved.

That is, since the height of the core layer 1 of the first optical waveguide 9 and the height of the core layer 16 of the second optical waveguide 20 can be matched to each other by placing the optical component 14 to be directly contacted to the lower clad layer 3 in the first optical waveguide 9 in the optical waveguide sheet 7, it is possible to achieve excellent optical coupling between the first optical waveguide 9 and the second optical waveguide 20.

Fourth Embodiment

Figure 9:
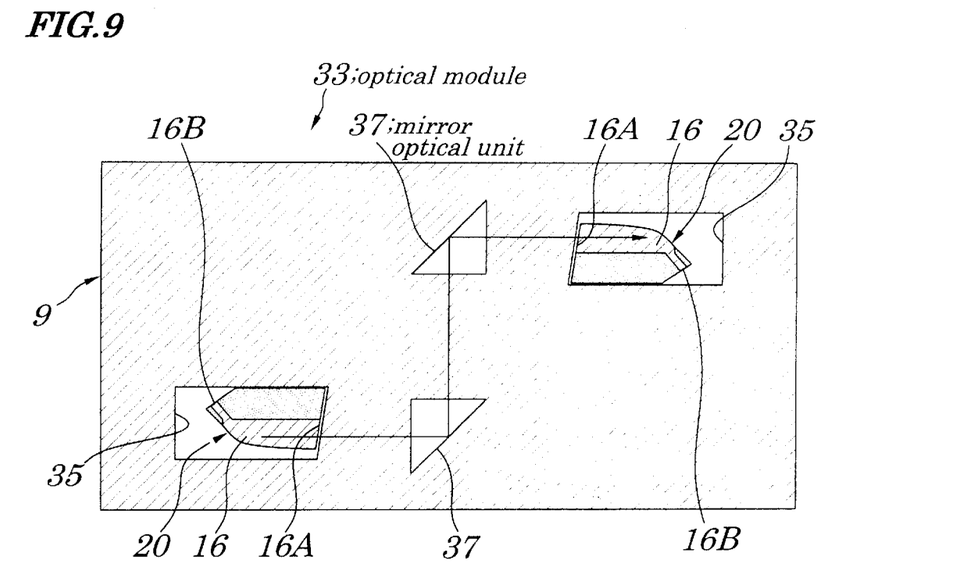
FIG. 9 is a top view showing configurations of an optical module according to a fourth embodiment of the present invention.
Figure 10A:
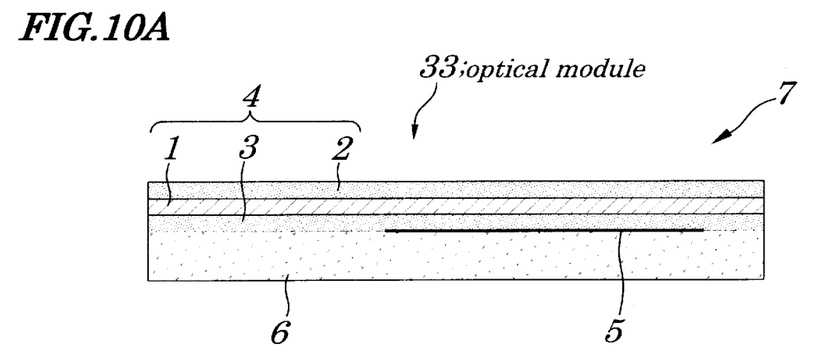
FIGS. 10A, 10B, and 10C are process diagrams illustrating a method for manufacturing the optical module in order of processes employed in the fourth embodiment of the present invention.
Figure 10B:
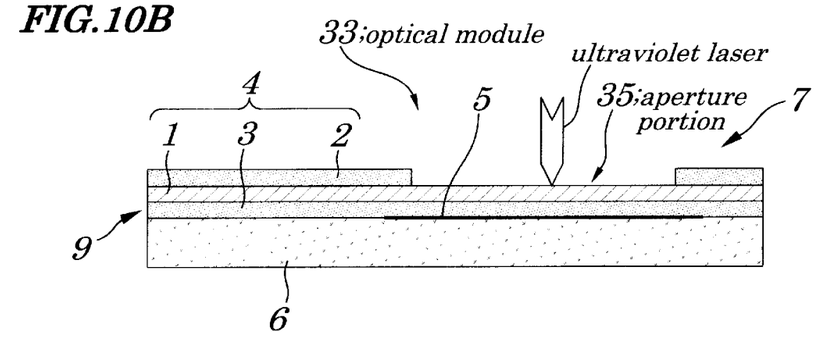
Figure 10C:
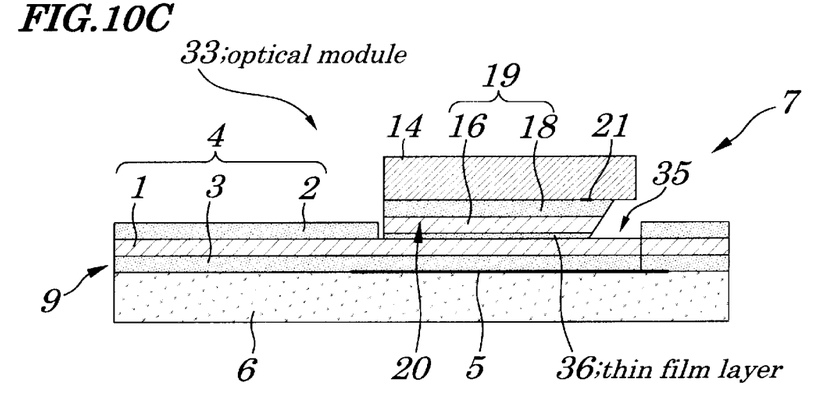

FIG. 9 is a top view showing configurations of an optical module according to a fourth embodiment of the present invention. FIGS. 10A, 10B, and 10C are process diagrams illustrating a method for manufacturing the optical module in order of processes employed in the fourth embodiment of the present invention. Configurations of an optical module 33 of the fourth embodiment differ from those in the first embodiment in that a first optical waveguide 9 and a second optical waveguide 20 make up a directional coupler.

The optical module 33 of the embodiment of the present invention, as shown in FIGS. 9 and 10A to 10C, is made up of an optical waveguide sheet 7 having the first optical waveguide 9 formed by bonding a first film 4 to a base substrate 6 with a metal layer 5 interposed between the first film 4 and the base substrate 6 and by forming an aperture portion 35 in a manner that a core layer 1 is exposed in a desired region in the first film 4, and having an optical component 14 having the second optical waveguide 20 constructed in a manner that a core layer 16 making up a second film 19 is formed to have a parabolic shape and a thin film layer 36 is formed so as to cover the core layer 16 of the second optical waveguide 20 and wherein the optical component 14 is placed in the aperture portion 35 in the optical waveguide sheet 7 and the core layer 16 in the above second optical waveguide 20 in the optical component 14 is disposed so as to be opposite to the core layer 1 in the first optical waveguide 9 in the optical waveguide sheet 7 with the thin film layer 36 being interposed between the core layer 16 and the core layer 1 so that the first optical waveguide 9 and the second optical waveguide 20 are optically coupled. Moreover, at midpoints of an optical path of the first optical waveguide 9 are formed mirror units 37 (FIG. 9) used to totally reflect light and to change a direction of a light path to a perpendicular direction. Thus, the first optical waveguide 9, thin film layer 36, and second optical waveguide 20 make up the directional coupler.

Next, a method for manufacturing the optical module 33 will be explained in order of processes by referring to FIGS. 10A, 10B, and 10C.

First, as shown in FIG. 10A, the optical waveguide sheet 7 is formed by bonding the first film 4 in which upper and lower faces of the core layer 1 made from glass materials exhibiting small optical transmission loss are coated respec-tively with an upper clad layer 2 made from an organic resin exhibiting small optical transmission loss and having a low refractive index and with a lower clad layer 3 made from glass materials and having a refractive index being lower than that of the core layer 1, to a base substrate 6 with the metal layer 5 made from aluminum (Al), copper (Cu), or a like being interposed between the first film 4 and the base substrate 6 made from an organic resin or a like.

A method for forming the first film 4 is described specifically. First, the core layer 1 is formed by dissolving a siloxane polymer in a methylisobutyl ketone and applying the siloxane polymer dissolved in the methylisobutyle ketone to a glass substrate serving as the lower clad layer 3 so as to have a film thickness of about 20 $\mu$m and, after having performed a one hour baking treatment at about 250° C. and then having performed a drying treatment, by heating the glass substrate at about 1100° C. and making it vitrifaction. The core layer 1 made from the glass material has small transmission loss and is excellent in light transmittance and in heat-resistance.

Then, the upper clad layer 2 made from organic resins having a refractive index being lower than that of the core layer 1 so as to have a film thickness of about 20 $\mu$m is grown on the core layer 1 to finally form the first film 4.

Next, as shown in FIG. 10B, the first optical waveguide 9 is formed by performing abrasion processing using ultraviolet laser in a desired portion (where the optical component 14 is to be placed as described later) in the first film 4 in the optical waveguide sheet 7 to remove the upper clad layer 2 and by forming an aperture portion 35 in which the core layer 1 is exposed. In this case, the metal layer 5 acts as a stopper against the ultraviolet laser.

Then, as shown in FIG. 10C, the optical component 14 is prepared which has the second optical waveguide 20 formed by, in advance, forming the core layer 16 in the second film 19 in a parabolic form and then by coating a lower face of the core layer 16 with the lower clad layer 18 and by coating a surface of the core layer 16 with a thin film layer 36 made from an organic resin having a refractive index being lower than that of the core layer 16 with a thickness of about 1 $\mu$m with a length of about 200 $\mu$m. Next, the optical module 33, as shown in FIG. 9, is formed by placing the optical component 14 in the aperture portion 35 and by bonding the core layer 16 of the second optical waveguide 20 to the core layer 1 of the first optical waveguide 9 with the thin film layer 36 interposed between the core layer 16 of the second optical waveguide 20 and the core layer 1 of the first optical waveguide 9.

In the optical module 33 of the fourth embodiment, by the directional coupler made up of the core layer 1 in the first optical waveguide 9, thin film layer 36 having a refractive index being lower than the core layer 1 and the core layer 16 in the second optical waveguide 20, the first optical waveguide 9 and the second optical waveguide 20 are optically coupled. The thickness and length of the thin film layer 36 of the directional coupler are so formed that light is transmitted 100 percent between the first optical waveguide 9 and the second optical waveguide 20.

Next, operations of the optical module 33 of the embodiment will be explained. That is, the first optical waveguide 9 and the second optical waveguide 20 are optically coupled by the directional coupler made up of the thin film layer 36 serving as a region for establishing connection between the upper portion and the lower portion of the directional coupler, of the core layer 1 and core layer 16. In the directional coupler, if a difference in a specific refractive index among the thin film layer 36, core layer 1 and core layer 16 in the directional coupler is about 0.01, evanescent light is swept out and is transmitted to upper and lower connection layers which attenuates at a rate of about exp $(-2\pi \cdot ((1-n^2)^{1/2} \cdot d/\lambda))$, where "n" denotes a value obtained by dividing the refractive index of the thin film layer 36 by a refractive index of each of the core layers 1 and 16, "λ" denotes a wavelength of light and "d" denotes a thickness of the thin film layer 36. Now, if the refractive index of the core layers 1 and 16 is 1.535 and if the relative index of the thin film layer 36 is 1.530, "n" becomes 0.9967. If "λ"=1.3 μm, by actions of the above directional coupler, light is reduced to a half when "d"=1.8 μm m and to one tenth or less when "d"=6 μm. Therefore, the optical module 33 is provided with a mode binding constant "κ" which causes light to sweep out from one core layer of the second optical waveguide 20 through the thin film layer 36. The mode binding constant "κ" is represented by the following expression.

$$\kappa \sim (\lambda/t^2) \cdot \exp(-2\pi \cdot ((1-n^2)^{1/2} \cdot d/\lambda)) \quad \text{(Expression 1)}$$

where "t" denotes a thickness of the second optical waveguide 20.

A luminous flux that moves from one core layer to the other core layer changes periodically depending on a length "z" of the thin film layer 36 in a travelling direction of light. When the length "z" of the thin film layer 36 becomes a value given by an expression 2, all the luminous flux move from one core layer to the other core layer in the optical waveguide 20.

$$z = (\pi/2)/\kappa \quad \text{(Expression 2)}$$

If "n"=0.9967, "λ"=1.3 μm, t=10 μm, and d=1 μm, from the above expressions 1 and 2, "z" being 229 μm can be obtained. Therefore, a region of the thin film layer 36 is formed so as to have a distance of 229 μm in a traveling direction of light. That is, by having the first optical waveguide 9 and second optical waveguide 20 contact each other over the distance of 229 μm with the thin film layer 36 with a thickness of 2 μm interposed between the first optical waveguide 9 and second optical waveguide 20, light is transmitted 100 percent from one optical waveguide to the other optical waveguide.

Thus, according to the fourth embodiment of the present invention, in addition to effects obtained in the first embodiment, following effects can be achieved.

Since the core layer 1 of the first optical waveguide 9 in the optical waveguide sheet 7 is formed so as to contact the core layer 16 in the second optical waveguide 20 in the optical component 14 in upper and lower directions, no fabrication of the core layer 1 in the first optical waveguide 9 in the optical waveguide sheet 7 is required and, therefore, not only the organic resin but also the glass material can be selected as the material of the core layer 1 which enables the optical transmission loss to be further reduced.

Fifth Embodiment

Figure 11:
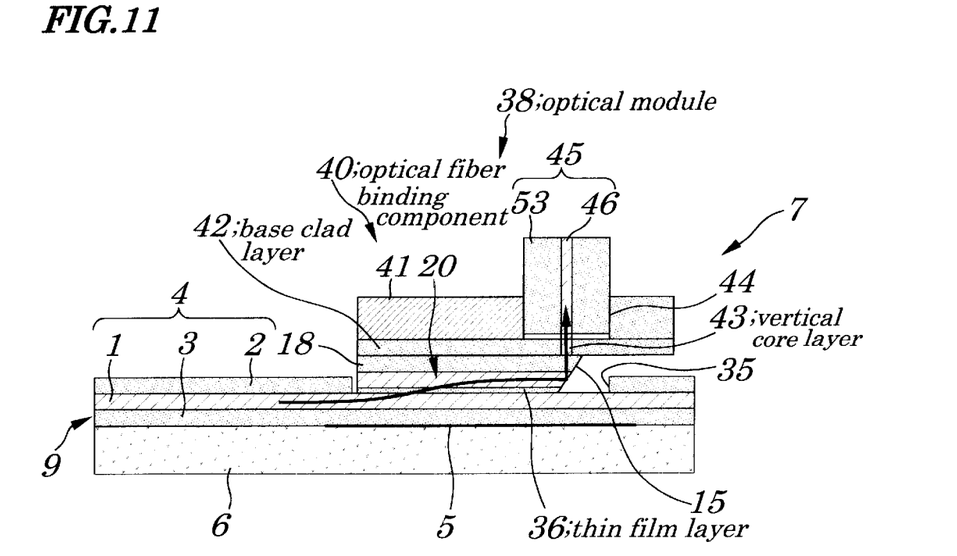
FIG. 11 is a cross-sectional view showing configurations of an optical module according to a fifth embodiment of the present invention.
Figure 12:
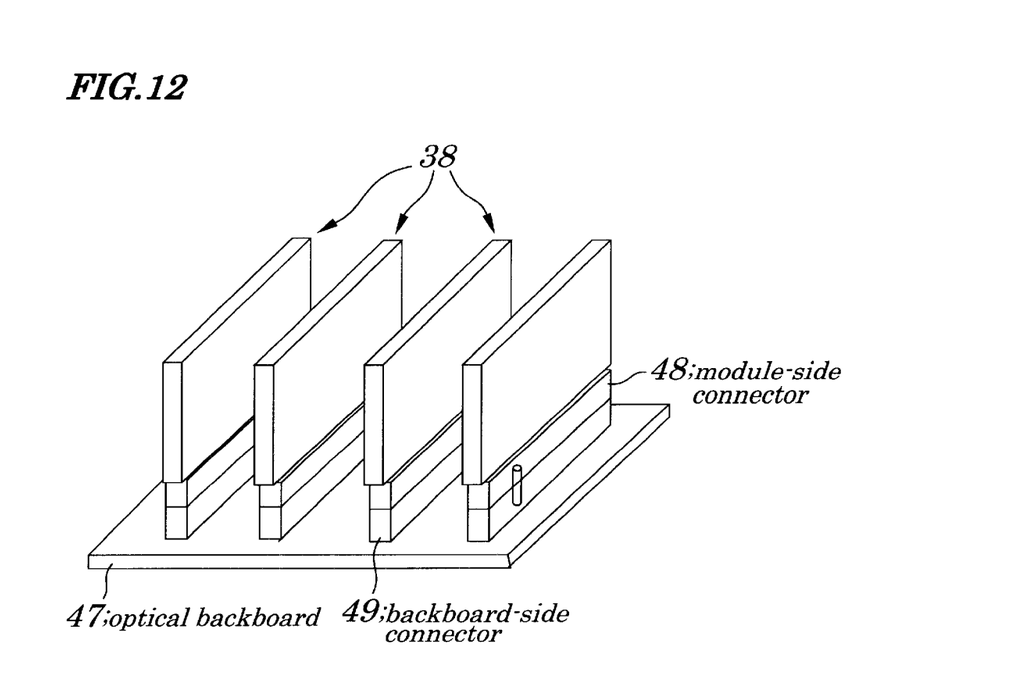
FIG. 12 is a perspective view showing the optical module implemented on an optical backboard according to a fifth embodiment of the present invention.

FIG. 11 is a cross-sectional view showing configurations of an optical module according to a fifth embodiment of the present invention. FIG. 12 is a perspective view of the optical module of the embodiment implemented on an optical backboard. Configurations of the optical module of the fifth embodiment differ from those in the fourth embodiment in that an optical fiber binding component instead of the optical component is used. In an optical module 38 of the fifth embodiment, as shown in FIG. 11, an optical fiber binding component 40 is placed in an aperture portion 35 in an optical waveguide sheet 7 and a second optical waveguide 20 in the optical fiber binding component 40 is formed so as to be disposed opposite to a first optical waveguide 9 in the optical waveguide sheet 7, which enables the first optical waveguide 9 and the second optical waveguide 20 to be optically coupled. In the optical fiber binding component 40, the second optical waveguide 20 is bonded to a fiber guide 41 made from an organic resin or a like, or a glass substrate or a like, with a base clad layer 42 interposed between the second optical waveguide 20 and the fiber guide 41, and a vertical core layer 43 is formed at a place of the base clad layer 42 corresponding to a place where light reflected by a mirror face 15 in the second optical waveguide 20 travels. Moreover, a fiber binding hole 44 is formed at a place being disposed opposite to the vertical core layer 43 in the fiber guide 41 and an optical fiber 45 is mounted in the fiber binding hole 44 in a manner that the optical fiber 45 is detachable. A core layer 46 of the optical fiber 45 is coated with a clad layer 53.

Next, a method for manufacturing the optical module 38 is described in order of processes.

First, the vertical core layer 43 is formed at a place where light totally reflected by the mirror face 15 in the second optical waveguide 20 in the base clad layer 42 having a film thickness of about 10 μm travels. The base clad layer 42 in which the vertical core layer 43 is formed is bonded to the fiber guide 41 with a thickness of about 1 mm in which the fiber binding hole 44 having a diameter of about 125 μm has been, in advance, formed at a position being opposite to the vertical core layer 43. Next, the second optical waveguide 20 made up of a lower clad layer 18 and core layer 16 is formed on the base clad layer 42. Thus, the optical fiber binding component 40 is formed. Then, by inserting the optical fiber 45 into the fiber binding hole 44 in the optical fiber binding component 40, the manufacturing of the optical module 38 is completed.

A plurality of such the optical modules 38 is implemented on an optical backboard 47 to construct an optical communication device having desired functions. Each of the optical modules 38 is implemented by connecting a module-side connector 48 to a backboard-side connector 49.

According to the fifth embodiment, approximately the same effects as obtained in the fourth embodiment can be achieved. In the fifth embodiment, by using the optical fiber binding component 40, instead of an optical component 14, the optical backboard 47 adapted to optically couple the optical fibers 45 to each other, which is disposed in a direction being vertical to a base substrate 6 can be formed.

Sixth Embodiment

Figure 13:
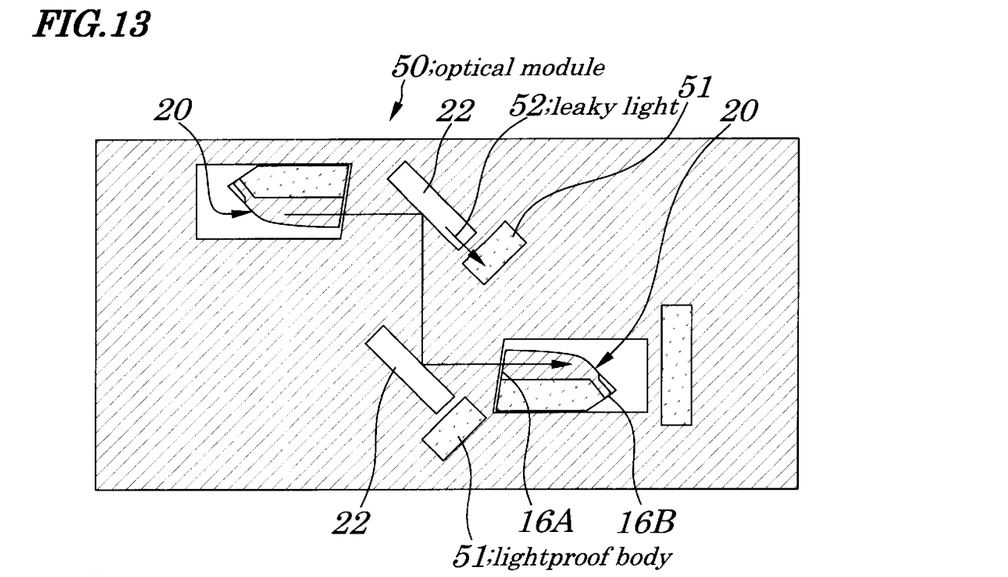
FIG. 13 is a top view showing configurations of an optical module according to a sixth embodiment of the present invention.
Figure 14:
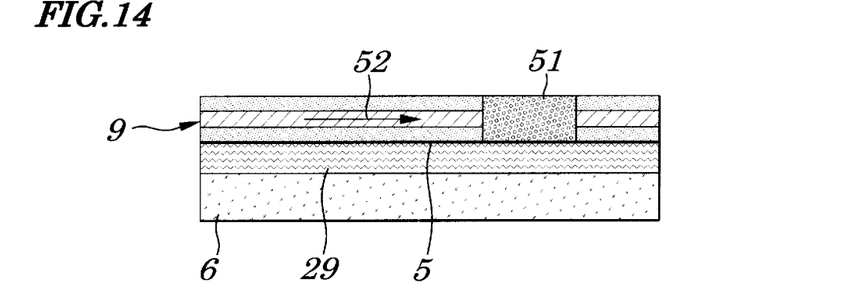
FIG. 14 is a cross-sectional view showing configurations of part of the optical module according to the sixth embodiment of the present invention.

FIG. 13 is a top view showing configurations of an optical module according to a sixth embodiment of the present invention. FIG. 14 is a cross-sectional view showing configurations of part of the optical module according to the sixth embodiment of the present invention. Configurations of the optical module of the sixth embodiment differ greatly from those in the first embodiment in that the optical module can prevent influence by light that has leaked from an optical waveguide.

In an optical module 50 of the embodiment, as shown in FIGS. 13 and 14, a lightproof body 51 is formed at an end portion in a direction in which light from each of specular treads 22 travels. As a material for the lightproof body, for example, an epoxy resin in which a black pigment is mixed or a silicone resin in which the black pigment is used. Light that has traveled through a first optical waveguide 9 is totally reflected off the specular treads 22, however, part of the light is not reflected thus producing leaky light 52. Moreover, the leaky light 52 is produced in an area surrounding the first optical waveguide 9. The leaky light 52 is mixed with normal light being reflected in an irregular manner, which causes a noise.

Therefore, by forming the lightproof body 51 at the end portion in the direction in which light from each of the specular treads 22, the leaky light 52 produced by insufficient total reflection or the leaky light 52 occurring in the area surrounding the first optical waveguide 9 is cut off by the lightproof body 51 and therefore occurrence of noise can be inhibited.

According to the sixth embodiment, in additions to effects obtained in the first embodiment, the following effects can be achieved. That is, since the lightproof body 51 is formed on the optical waveguide, the occurrence of noises caused by leaked light can be inhibited.

Additionally, according to the embodiment, since the lightproof body 51 is formed in the optical waveguide, the occurrence of the noise caused by the leaky light can be inhibited.

It is apparent that the present invention is not limited to the above embodiments but may be changed and modified without departing from the scope and spirit of the invention. For example, the position of and the number of a second optical waveguide 20 placed in the aperture portion of the first optical waveguide 9 may be arbitrarily selected. Moreover, material for each of the first optical waveguide 9 and the second optical waveguide 20 is not limited to those shown in each of the above embodiments. Between faces of the first optical waveguide 9 and the second optical waveguide 20 being disposed opposite to each other may be interposed space or appropriate insulating material. In the above embodiment, only one example of the thickness of the core layer and each clad layer in each of the first optical waveguide 9 and the second optical waveguide 20 is shown, however, their thickness can be changed depending on their use or application.

What is claimed is:

1. An optical module for optically coupling a first optical waveguide constructed using a first film in which a core layer is coated with a clad layer and a second optical waveguide constructed using a second film in which a core layer is coated with a clad layer, comprising:

an optical waveguide sheet having said first optical waveguide in which said first film is bonded to a base substrate with a metal layer interposed between said first film and said base substrate and in which an aperture portion is formed in a desired region of said first film; and an optical component having a second optical waveguide in which said core layer in said second film is formed in a parabolic shape;

wherein said optical component is placed in said aperture portion in said optical waveguide sheet and wherein an end face of a large diameter portion in the parabolic-shaped core layer in said optical component is disposed so as to be opposite to an end face of said core layer in said first optical waveguide in said optical waveguide sheet so that said first optical waveguide and said second optical waveguide are optically coupled to each other.

2. The optical module according to claim 1, wherein said core layer of said first optical waveguide and said core layer of said second optical waveguide are formed so that heights of said core layer in said first optical waveguide and of said core layer in said second optical waveguide are same on said base substrate.

3. The optical module according to claim 1, wherein said clad layer of said first film is made up of a first clad layer and a second clad layer which cover first and second faces of said core layer respectively.

4. The optical module according to claim 3, wherein said second clad layer, said core layer and said first clad layer are made up of organic resins.

5. The optical module according to claim 3, wherein said second clad layer is made of a glass material and wherein said core layer and first clad layer are made of organic resins.

6. The optical module according to claim 3, wherein said first clad layer is made of an organic resin and said core layer and second clad layer are made of a glass material.

7. The optical module according to claim 1, further comprising an optical fiber binding component, instead of said optical component, wherein said optical fiber binding component is disposed in said aperture portion in said optical waveguide sheet and wherein said second optical waveguide in said optical fiber binding component is disposed so as to be opposite to said first optical waveguide in said optical waveguide sheet so that said first optical waveguide and said second optical waveguide are optically coupled.

8. The optical module according to claim 1, wherein specular treads are formed at a midpoint of an optical path in said first optical waveguide which are used to totally reflect light and to change a direction of said optical path to a perpendicular direction.

9. The optical module according to claim 1, wherein an end face of a large diameter portion of said core layer in said second optical waveguide is disposed so as to be opposite to an end of said core layer in said first optical waveguide in a state being inclined relative to an optical axis.

10. An optical module for optically coupling a first optical waveguide constructed using a first film in which first and second faces of a core layer are coated respectively with a first clad layer and a second clad layer and a second optical waveguide constructed using a second film in which first and second faces of a core layer are coated respectively with a first clad layer and a second clad layer, comprising:

an optical waveguide sheet having a first optical waveguide in which said first film is bonded to a base substrate with a metal layer interposed between said first film and said base substrate and in which an aperture portion is formed in a desired region of said first film where said metal layer is exposed;

an optical component having a second optical waveguide in which said core layer in said second film is formed in a parabolic shape;

wherein said optical component is placed in said aperture portion in said optical waveguide sheet and wherein an end face of a large diameter portion in the parabolic-shaped core layer in said optical component is disposed so as to be opposite to an end face of said core layer in said first optical waveguide in said optical waveguide sheet so that said first optical waveguide and said second optical waveguide are optically coupled to each other.

11. The optical module according to claim 10, wherein said core layer of said first optical waveguide and said core layer of said second optical waveguide are formed so that heights of said core layer in said first optical waveguide and of said core layer in said second optical waveguide are same on said base substrate.

12. The optical module according to claim 10, wherein each said second clad layer, each said core layer and each said first clad layer are made up of organic resins in said first film and said second film.

13. The optical module according to claim 10, wherein each said second clad layer is made of a glass material in said first film and said second film and wherein each said core layer and each first clad layer are made of organic resins in said first film and said second film.

14. The optical module according to claim 10, wherein a first wiring pattern is formed on said base substrate in said optical waveguide sheet while a second wiring pattern corresponding to said first wiring pattern is formed in said optical component wherein said first wiring pattern and said second wiring pattern are connected to each other.

15. An optical module for optically coupling a first optical waveguide constructed using a first film in which a core layer is coated with a clad layer and a second optical waveguide constructed using a second film in which a core layer is coated with a clad layer, comprising:

an optical waveguide sheet having a first optical waveguide in which said first film is bonded to a base substrate with a metal layer interposed between said first film and said base substrate and in which an aperture portion is formed in a desired region of said first film where said core layer is exposed;

an optical component having a second optical waveguide in which said core layer in said second film is formed in a parabolic shape and in which a thin film layer is formed so that said core layer in said second film is coated with said thin film layer; and wherein said optical component is placed in said aperture portion in said optical waveguide sheet wherein said core layer in said optical waveguide of said optical component is disposed so as to be opposite to said core layer in said first optical waveguide in said optical waveguide sheet with said thin film being interposed between said core layer in said first optical waveguide and said core layer in said second optical waveguide so that said first optical waveguide and said second optical waveguide are optically coupled to each other.

16. The optical module according to claim 15, wherein said clad layer of said first film is made up of a first clad layer and a second clad layer which cover first and second faces of said core layer respectively.

17. The optical module according to claim 16, wherein said second clad layer, said core layer and said first clad layer are made up of organic resins.

18. A method for manufacturing an optical module for optically coupling a first optical waveguide and a second optical waveguide, comprising:

a first process of forming an optical waveguide sheet by bonding a first film in which a first face and a second face of a core layer made of an organic resin are coated respectively with a first clad layer and a second clad layer made of an organic resin to a base substrate with a metal layer being interposed between said first film and said base substrate;

a second process of forming a first optical waveguide by performing abrasion processing using ultraviolet laser at a desired region of said first film in said optical waveguide sheet to form an aperture portion with said metal layer being exposed; and a third process of mounting an optical component having a second optical waveguide formed in a manner that a core layer in a second film has a parabolic shape in said aperture portion and placing an end face of a large diameter portion of said core layer having said parabolic shape in said optical component so as to be disposed opposite to an end face of said core layer in said first optical waveguide in said optical waveguide sheet.

19. A method for manufacturing an optical module for optically coupling a first optical waveguide and a second optical waveguide to each other, comprising:

a first process of forming an optical waveguide sheet by bonding a first film in which a first face and a second face of a core layer made of an organic resin are coated respectively with a first clad layer and a second clad layer made of a glass material to a base substrate with a metal layer being interposed between said first film and said base substrate;

a second process of forming a first optical waveguide by performing abrasion processing using ultraviolet laser at a desired region of said first film in said optical waveguide sheet to form an aperture portion with said second clad layer being exposed; and a third process of mounting an optical component having a second optical waveguide formed in a manner that a core layer in a second film has a parabolic shape in said aperture portion and placing an end face of a large diameter portion of said core layer having said parabolic shape in said optical component so as to be disposed opposite to an end face of said core layer in said first optical waveguide in said optical waveguide sheet.

20. A method for manufacturing an optical module for optically coupling a first optical waveguide and a second optical waveguide to each other, comprising:

a first process of forming an optical waveguide sheet by bonding a first film in which a first face and a second face of a core layer made of a glass material are coated respectively with a first clad layer made of an organic resin and a second clad layer made of a glass material to a base substrate with a metal layer being interposed between said first film and said base substrate;

a second process of forming a first optical waveguide by performing abrasion processing using ultraviolet laser at a desired region of said first film in said optical waveguide sheet to form an aperture portion with said core layer being exposed; and a third process of mounting an optical component having a second optical waveguide in which a core layer of said second film is formed so as to have a parabolic shape and a thin film layer formed so as to cover said core layer of said second optical waveguide in said aperture portion and placing said core layer of said second optical waveguide so as to be disposed opposite to said core layer in said first optical waveguide in said optical waveguide sheet.

* * * * *